Nov. 28, 1950 — R. A. NICHOLSON — 2,532,118
BEVERAGE DISPENSING APPARATUS
Filed Sept. 17, 1945 — 7 Sheets-Sheet 5

Inventor:
Ralph A. Nicholson
By [signature]
Attorney

Nov. 28, 1950     R. A. NICHOLSON     2,532,118
BEVERAGE DISPENSING APPARATUS
Filed Sept. 17, 1945     7 Sheets-Sheet 7

Inventor:
Ralph A. Nicholson
By
Attorney

Patented Nov. 28, 1950

2,532,118

UNITED STATES PATENT OFFICE 2,532,118

BEVERAGE DISPENSING APPARATUS

Ralph A. Nicholson, Chicago, Ill., assignor, by mesne assignments, to Lyon Industries, Inc., New York, N. Y., a corporation of Delaware Application September 17, 1945, Serial No. 616,855

14 Claims. (Cl. 222—133)

This invention pertains to beverage dispensing apparatus, and has as its principal object the provision of a small, compact unit for dispensing measured amounts of refrigerated beverage, the unit being of such size that it can be installed on the conventional soda fountain counter, the unit being further self-contained to include its own refrigeration apparatus, certain automatic beverage-syrup and carbonated-water mixing or blending means, as well as other novel instrumentalities and features of construction and operation making possible a minimized over-all size, and exceptionally high efficiency in delivering a rapid succession of measured drinks of uniform mixture and temperature.

More detailed objects relate to the provision, in a device of the class described above, of novel blending means by which carbonated water and flavoring syrup are mixed in accurately measured amounts, automatically and quickly and thoroughly blended for direct flow into a dispensing spigot; to the provision of novel heat exchange means of great efficiency by means of which the beverage liquid is quickly cooled to a certain temperature as it arrives from a remote source of supply, said temperature being maintained notwithstanding a rapid withdrawal of drinks; to the provision of a novel standby circulation system forcing the carbonated water through the heat-exchanging means when no drinks are being withdrawn; to the provision of a novel mixing or blending valve; and to the provision of cooperating instrumentalities so constructed, shaped, and arranged in assembled relation as to afford a unit of unprecedented compactness and small size.

Additional objects and aspects of novelty relate to details of construction, arrangement, and operation of the preferred embodiment illustrated in the annexed drawings in which.

Generalized description

Figure 1:
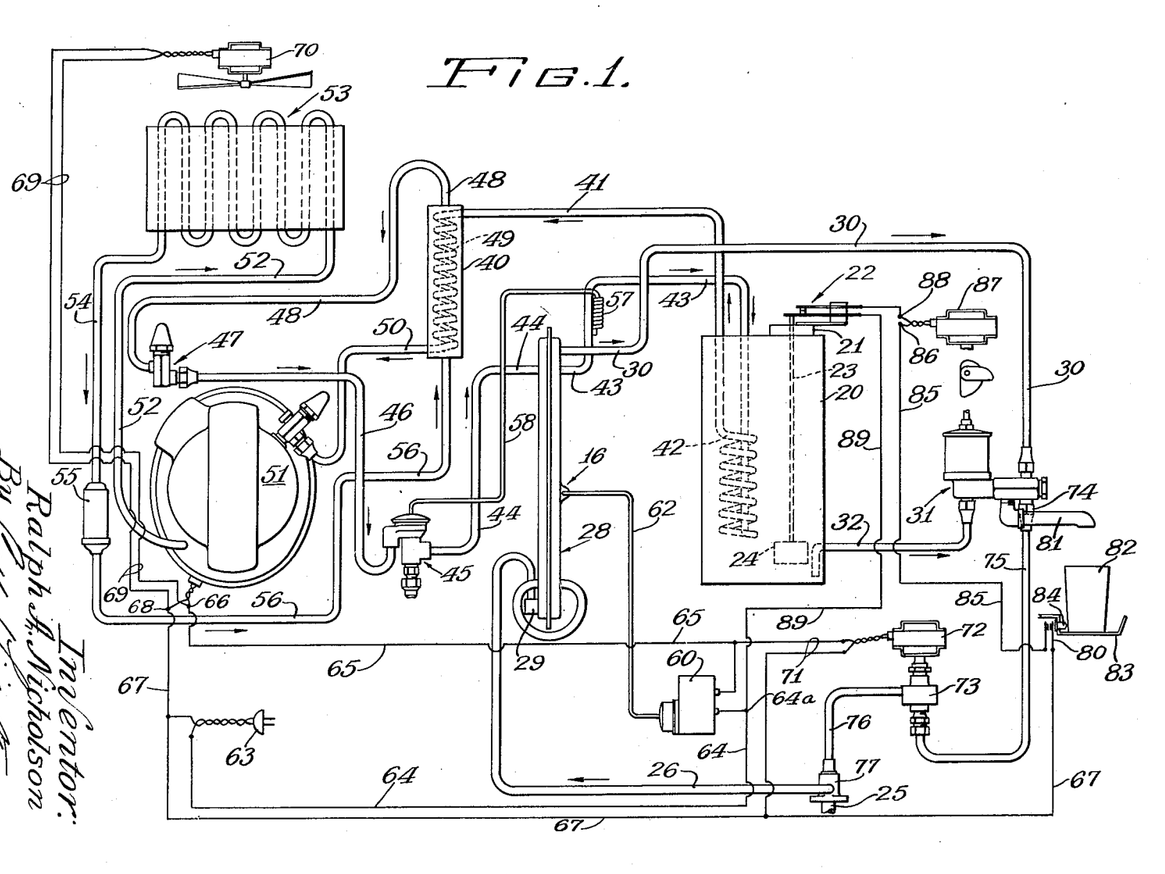
Fig. 1 is a schematic diagram of the essential elements of the system embodied in the dispensing unit.

Referring to the schematic layout of Fig. 1, the novel dispensing unit includes a syrup container or tank 20 having a filler cap 21 with a control switch 22 thereon and adapted to be held closed by rod 23 on level float 24; this tank holds a supply of flavoring syrup which is to be mixed and blended with another liquid, such as carbonated water, which enters the system via conduit or pipe 25 leading from a conventional supply of carbonated water unshown.

Normally, the carbonated water passes through conduit 26 into a special heat exchanger 28 at connection 29, then passes from the exchanger via tube 30 to a special blending and mixing valve 31, the latter also having connection 32 into the syrup tank 20.

Cooling of the carbonated water in the heat exchanger 28 is effected by expansion of liquid refrigerant from the receiver 40 under suction from the compressor unit 51, reducing pressure in line 50, in the super-heat exchanging coil 49 in the receiver, in suction line 41, syrup cooling coil 42 in the syrup tank, in line 43 connecting with the refrigerant outlet on the heat exchanging plate 28, refrigerant inlet line 44 to the plate 28, so that liquid refrigerant will be expanded into the latter under control of expansion valve 45 connecting via line 46, service valve 47 and liquid refrigerant line 48 from the top of the receiver 40.

The expanded refrigerant gas drawn into suction line 50, is recompressed by the small compressor unit 51 and passes via line 52 into a known type of condenser unit 53 to become liquified and returned via line 54, trap 55, line 56, into the bottom of the receiver 40 for re-expansion. Operation of the expansion valve 45 is controlled by a thermal expansion feeler bulb 57, contacting the expansion line 43, and connecting with valve 45 through tube 58 to open valve 45 in accordance with known principles when the temperature of refrigerant in line 43 rises above a desired value, and control the rate of expansion of the refrigerant.

Operation of the compressor unit is controlled by an adjustable regulator 60 of known type and including a thermal expansion bulb 61 (see also Fig. 13) disposed in the water compartment of the heat exchanger and connected by tube 62 with the regulator such that when the temperature of the carbonated water in the exchanger rises above a predetermined value, regulator 60 closes an operating circuit for the compressor unit motor (housed in unit 51) from power source connection 63, conductor 64, regulator unit 60, conductor 65, junction 66 at the compressor unit, and conductor 67 from power connection 63 to junction 68 at the compressor unit.

When this latter operating circuit for the compressor is closed by the regulator as aforesaid, power is also connected from junctions 66 and 68 via conductors 69 to operate the condenser fan motor 70, and in addition power is also applied via conductors 71 to operate a special circulating pump motor 72, which drives a small circulating pump 73 to force carbonated water from connection 74 with the water line 39 at the mixing valve, via conduit 75, pump 73 and conduit 76 past check valve 77 and through line 26 and heat exchanger 28 back through line 30 so long as the compressor motor is operating, whereby an effective increase in the lineal travel of the water relative to the heat exchanging means is procured, with the result that a rapid cooling of the carbonated water is possible. Check valve 77 prevents drawing of water directly from the source connection 25.

Dispensing operation of the machine is effected by closing of switch contacts 80 beneath the spigot 81, as by pushing a glass or cup 82 in cup rest 83 against a button 84 to effect such closure of the switch contacts, whereby power is connected from conductor 67, said switch contacts 80, conductor 85 to one terminal 86 of mixing valve motor 87, and from junction 64a with power conductor 64 at the regulator via conductor 89, syrup tank control switch contacts 22 to terminal 88 of the mixing valve motor.

So long as there is a predetermined quantity of syrup in tank 20 adequate to elevate float 24 and thereby hold switch 22 closed, closure of the dispensing switch 80 will result in operation of mixing valve motor 87 and operation of the mixing or blending valve means 31, more fully described hereinafter, to effect injection of an exactly measured amount of flavoring syrup into an exactly measured amount of carbonated water issuing from spigot 81 into cup 82. When the predetermined amount of syrup in tank 20, necessary to maintain switch 22 closed as aforesaid, is exhausted, closure of switch 80 is without effect and no drink will be dispensed, whereby the attendant is apprised of the necessity of refilling tank 20.

While the features of the beverage dispensing system brought out in the foregoing general description are broadly applicable to larger installations, including permanent systems for dispensing either pre-mixed or mixed beverages or other liquids, the main object of the invention has been to provide a counter type dispenser which is in effect portable and wholly self-contained, and to this end said features make possible a beverage dispensing unit of a size and practical efficiency never before obtained, such that in fact the unit may be set upon the ordinary soda fountain counter and connected with a source of electric power and a source of carbonated water (at 25) and be ready to dispense a standard drink as to volume, temperature, and mixture, acceptable to the trade, in a matter of seconds, starting with the water and syrup at room temperature, and drinks of uniform character, as aforesaid, may thereafter be continuously withdraw in rapid succession.

*Detailed description*

In Figs. 2 to 5 is shown one preferred commercial embodiment of the novel dispensing unit wherein (Fig. 2) there is provided a base plate 90 upon which is secured the syrup tank 20 in upright condition near one, front, edge of said plate, and at the opposite or rear side of said plate is mounted the compressor unit 51 on resilient studs 91, said compressor unit being of the sealed-in variety with its motor and compressing pump (not seen) sealed in the housing generally indicated by reference character 51, such compressor units being well known in the art and not described in detail since the construction thereof does not per se constitute part of the invention.

Figure 4:
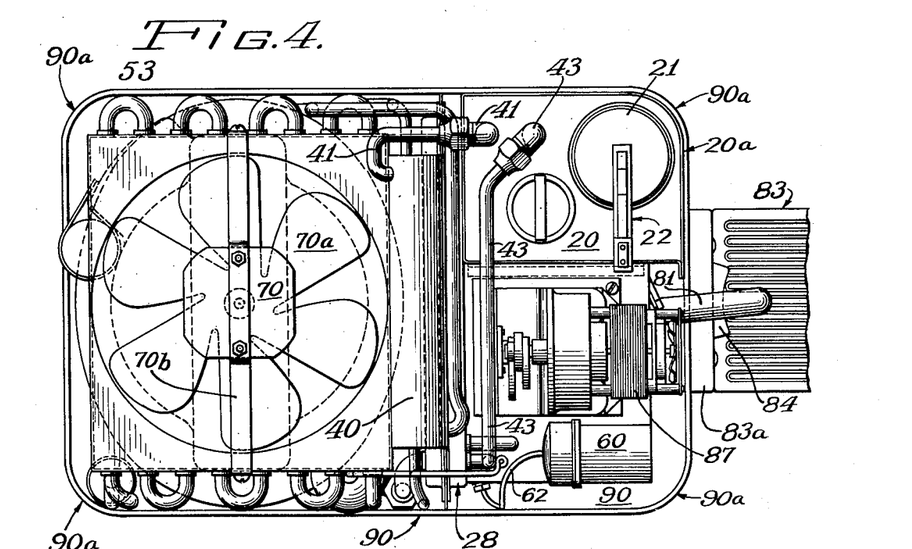
Fig. 4 is a top plan view of the same.

The condenser 53 is bracket supported above the compressor unit and carries on its upper side an air circulating fan 70a driven by motor 70, which is secured by strap 70b attached to the frame of the condenser (see also Fig. 4).

Figure 2:
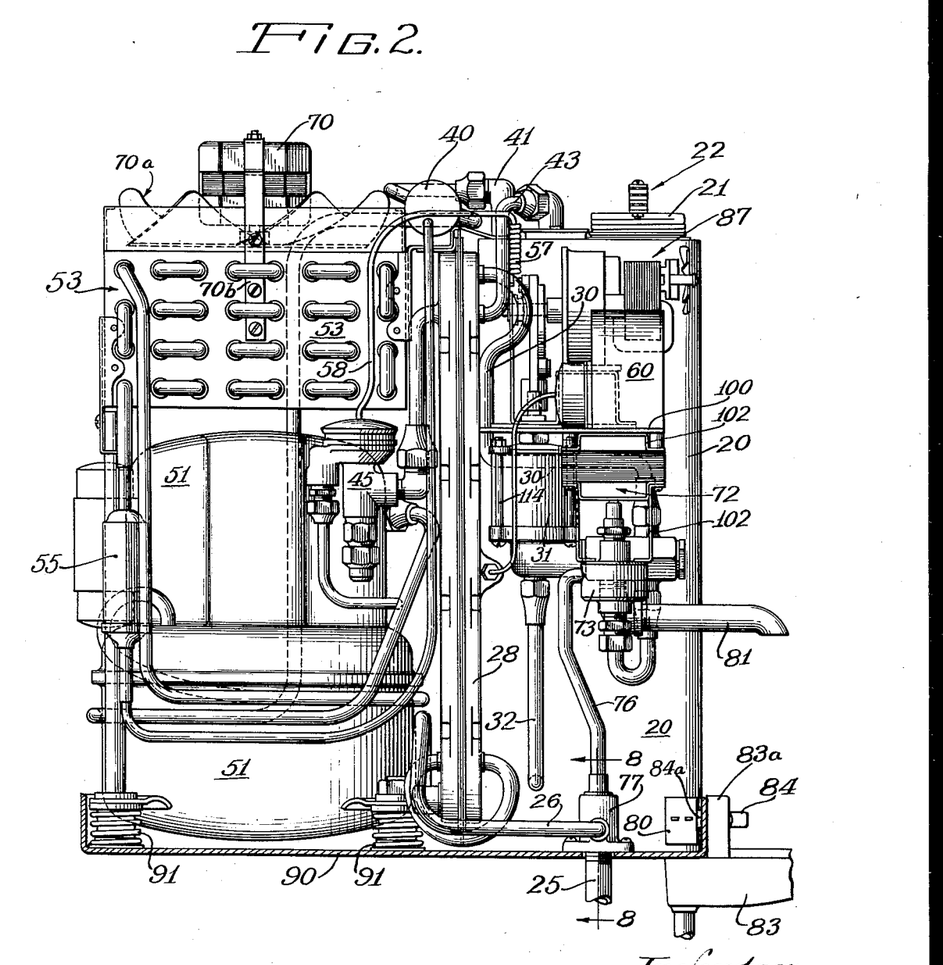
Fig. 2 is a side elevation of the unit with the cover or cabinet removed and parts shown in section.
Figure 3:
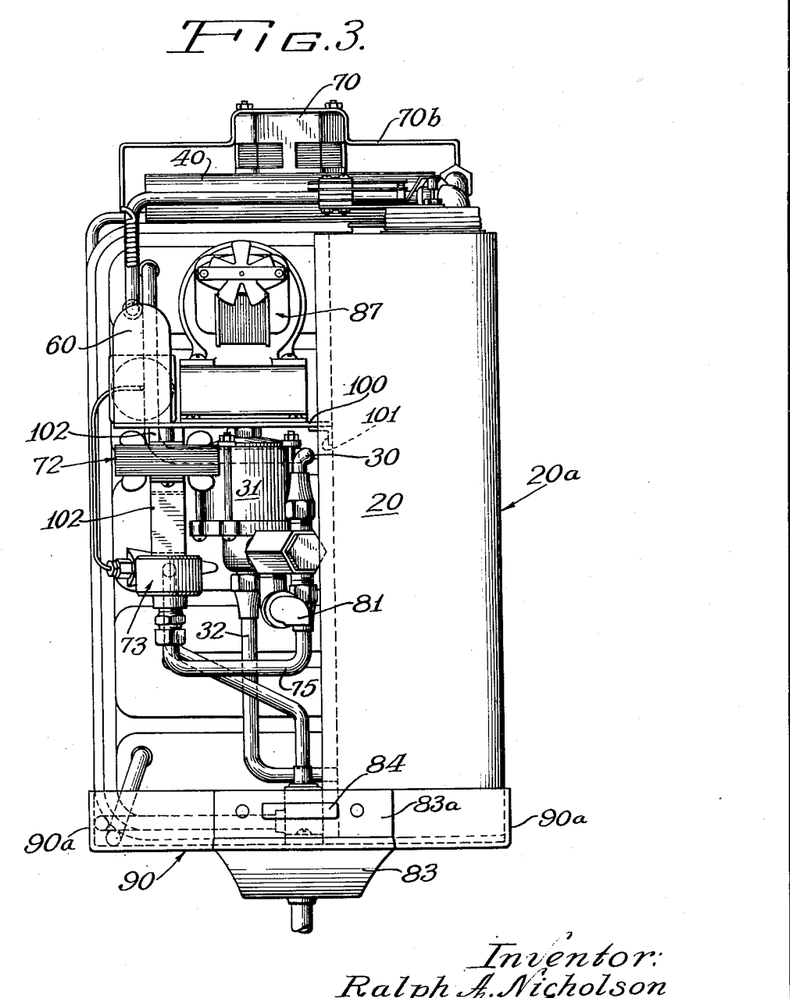
Fig. 3 is a front elevation of the same.

Mounted in upright position between the compressor unit and syrup tank 20 is the heat exchanger 28 (see also the horizontal sectional view of Fig. 5), refrigerant receiver 40 being disposed in horizontal condition above the heat exchanger as in Figs. 2, 3, and 4. Fluid line connections between the compressor, receiver, heat exchanger, syrup tank, water-circulating and dispensing lines are shown variously in Figs. 2 through 5 in accordance with the description under Fig. 1, it being noted in Fig. 2 that the carbonated water input connection 25 enters from below base plate 90 into the check valve 77, secured to said plate at one side of the syrup tank.

Looking toward the front of the dispensing machine, as in Fig. 3, it is observed that the syrup tank 20 is disposed at one side of the base plate and has a rounded outer side portion 20a conforming to the rounded corner portions 90a of the base plate which in turn conform to the curvatures of an especially designed cover.

Figure 5:
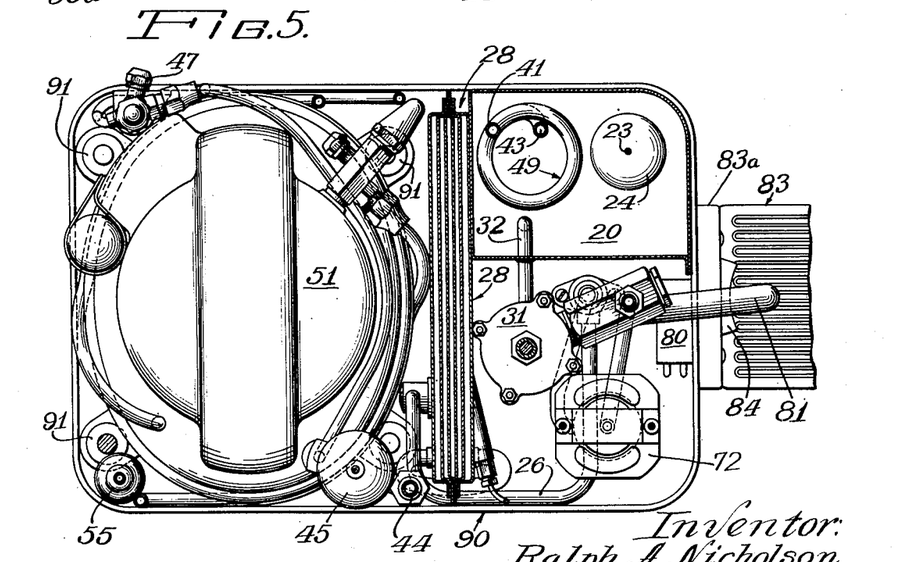
Fig. 5 is a horizontal section through the same.

Secured to the front edge of the base plate is a combination cup-support and drain casting 83 having an attaching flange 83a fitting against the rim of the base plate and in which is disposed the dispenser switch operating button 84 having an inner extension 84a (Fig. 2) engageable with the operating element (not seen) of the dispensing switch 80 mounted on plate 90 behind the cup support as in Fig. 5.

Suspended from a horizontal plate 100, attached to an angle bracket 101 welded to the side of the syrup tank, as in Fig. 3, is the blending and mixing valve 31, the driving motor 87 for which, as well as the associated driving cam means described in detail hereinafter, are mounted on the upper face of said plate 100, while the motor 72 and circulating pump 73 driven thereby, are suspended by bracket means 102 from the underside of said plate. Regulator 60 is also mounted on the upper side of plate 100, as in Figs. 3 and 4.

Figures 6, 7, 8:
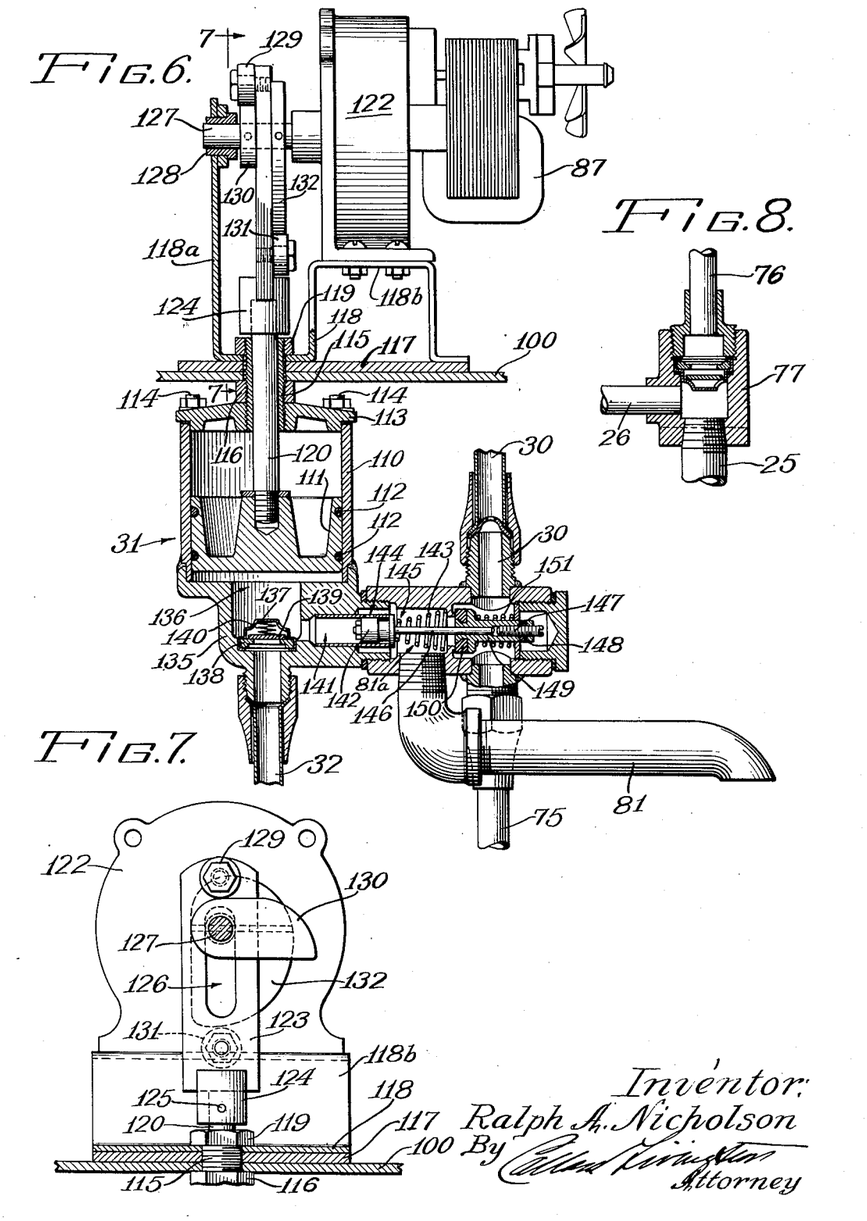
Fig. 6 is a vertical section, to enlarged scale, through the novel mixing or blending valve and motor means therefor shown in elevation.
Fig. 7 is a rear elevational view of the operating cam means for the blending valve of Fig. 6 looking in the direction of lines 7—7 thereof.
Fig. 8 is a vertical section, to enlarged scale, through the standby circulation valve looking in the direction of lines 8—8 of Fig. 2.

The mixing and blending valve, generally indicated at 31 throughout the drawings, is an important feature of the dispenser, and is shown in detail in Fig. 6 to consist of a pump cylinder 110 with a piston 111 movable vertically therein and provided with gum rubber rings 112 seated in grooves in the piston wall. A cap 113 is sealed against the top of the cylinder by bolt rods 114, and the entire valve unit is secured to the horizontal plate 100 by means of a nipple 115 threaded into the cover plate and locking bushing 116 and extending upwardly through plate 100, a motor mounting plate 117, and cam bracket 118 into a retaining bushing 119, through which piston rod 120 projects for connection with a special cam drive mechanism.

A small motor 87, attached to a conventional speed-reducing unit 122, is arranged to reciprocate the piston rod 120 through the agency of a special cam means such as shown in Fig. 7, and which includes a vertical bar 123 having a cylindrical coupling element 124 fixed to the lower end thereof and pinned onto the upper end of the piston rods as at 125, there being a vertically elongated slot 126 in the bar through which projects the drive shaft 127 from the speed reducer, this shaft having outer end support in bushing 128 (Fig. 6) in an upright extension 118a of bracket 118, a U-shaped extension 118b of which affords support for the speed-reduction and motor means 87, 122.

At the upper end of bar 123, Fig. 7, is a cam roller 129, engaged intermittently by a cam arm 130 fast on shaft 127 and serving to elevate the bar 123 and hence the piston rod 120 responsive to operation of motor 87. At the lower end of bar 123, and on the opposite side thereof from upper cam roller 129, is a second cam roller 131 (Figs. 6 and 7), engaged intermittently by a second cam arm 132 also fast on drive shaft 127, and serving to depress the piston rod 120.

At the bottom of pump cylinder 110 is a casting 135 having a chamber 136 communicating with the syrup input line 32 through a cage valve including cage 137, perforate seat 138, valve wafer 139 normally held closed by spring 140.

When piston 111 is moved upwardly by the aforesaid motor cam drive, valve wafer 139 rises to admit syrup from line 32 and tank 20, the cam stroke being regulated to draw an accurately measured amount of syrup into the cylinder chamber in accordance with the standard size of drink to be dispensed. This is the measuring function of the mixing and blending valve.

Upon downward displacement of the measuring piston 111, valve 139 closes and the syrup is forced into passage 141 against a small plunger 142, displacing the latter toward the right, Fig. 6, against the normalizing effort of spring 143, until the plunger opens a small passage 144, thereby permitting the syrup to escape therepast into an enlarged passage portion 145 communicating with the inner opening to spigot 81 at 81a.

As an important feature of this mixing and blending means, small plunger 142 carries rod 146 with it to the right into abutment against the inner end of adjusting screw 147, sealed by packing 148 in a bore in a water-valve plunger 149 having valve washer means 150 at it its inner end, so that the said water-valve plunger is shifted outwardly against spring 151, opening passage for carbonated water from water line 30 into the blending and mixing chamber 145, where this water (under the usual carbonating pressure of about 30 lbs.) is forcibly mingled and mixed with the inflowing syrup displaced by downward motion of piston 111, so that the syrup and water in a thoroughly blended mixture pass down into the spigot mouth 81a and issue from the spigot portion 81 into a cup placed on the drain-support 83 (Fig. 2).

Thus, the mixing valve withdraws a measured amount of syrup from the storage tank 20 and forces the syrup against the water valve means 142—150 to simultaneously admit water to the mixing chamber 145 and force the syrup into said mixing chamber and into the stream of water forcibly entering the same under the head of gas pressure behind the water, with the result that a complete and uniform beverage mixture issues from the spigot, both as to volume and relative proportions of syrup to water, it being apparent that so soon as the pressure behind the syrup drops as measuring piston 111 reaches the downward limit of its stroke, both valve portions 142 and 150 close under urgence of their respective springs 143 and 151.

In addition to the foregoing advantages as to accurate measuring and blending by the mixing valve, the latter also permits the attendant to draw any volume, more or less, of drink desired by withdrawing the cup from the dispensing switch control button before the standard measure of drink is dispensed, or by holding the cup (if larger than the arbitrary standard size) in position longer. This feature is of importance when it is considered that many customers wish to have cracked ice added to the drink when served, regardless of the fact that such drink will be of standard customary temperature when drawn from this dispensing machine, and under such circumstances, less than the standard volume of beverage must be drawn to leave room for the ice in the cup, it being important to observe that regardless of whether less or more than the standard volume of beverage be withdrawn from the dispenser, the mixture of syrup and water will always be maintained uniform as to relative proportions, and this is highly important both from the customers' and proprietors' viewpoints, such uniformity also being insisted upon by the manufacturers of certain nationally popular beverages.

Another highly important feature of the invention pertains to the novel heat exchanger shown in Figs. 9 through 15; by means of this novel construction, the lineal flow of carbonated water relative to the refrigerating agency is vastly increased within space limitations necessitated by the compactness and small overall dimensions of a counter type dispenser.

Figures 11, 12, 13, 14, 15:
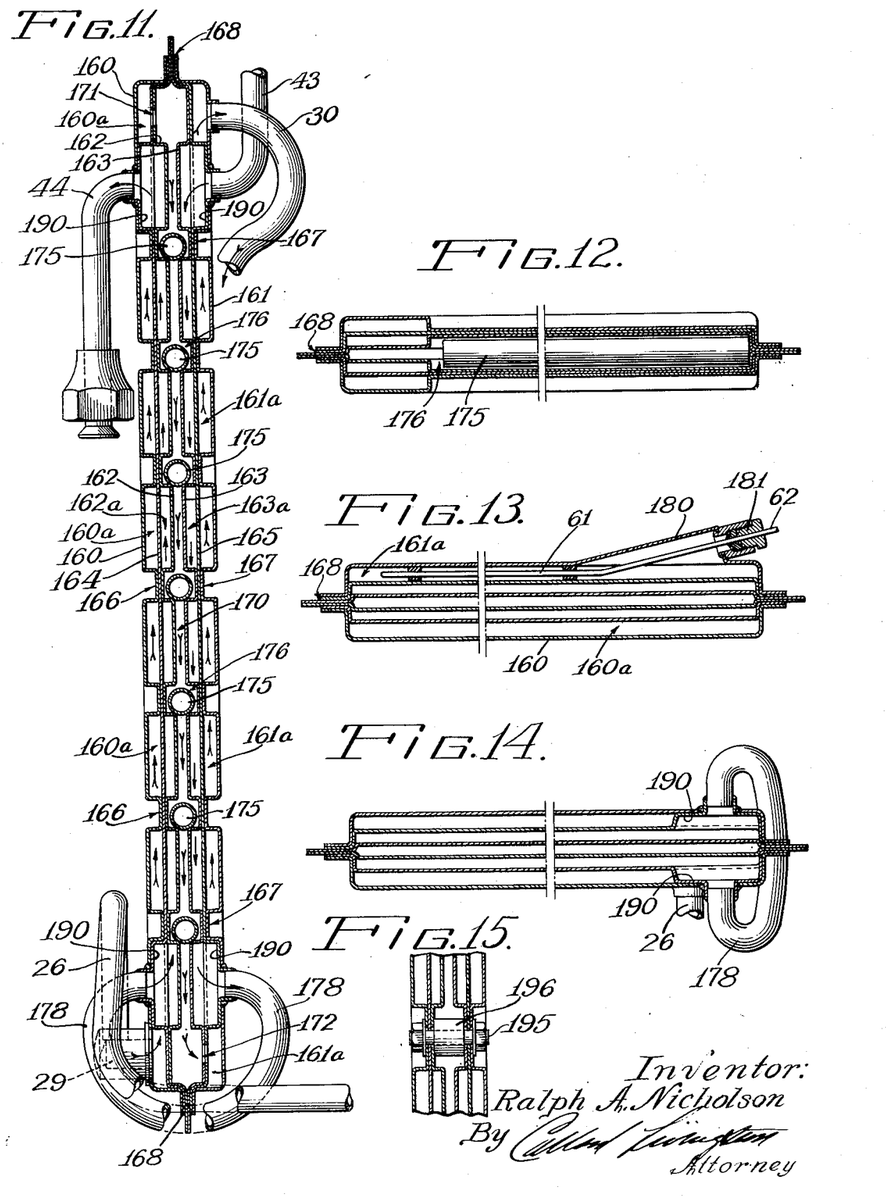
Fig. 11 is a vertical median section through the heat exchanger.
Fig. 12 is a horizontal section through the heat exchanger along lines 12—12 of Fig. 9.
Fig. 13 is another horizontal section through the heat exchanger along lines 13—13 of Fig. 9.
Fig. 14 is another horizontal section through the heat exchanger along lines 14—14 of Fig. 9.
Fig. 15 is a vertical sectional detail along line 15—15 of Fig. 9 at the center of the heat exchanger.

The improved heat exchanger, as visualized best in the sectional view of Fig. 11, consists of a plurality of plates, some of which have embossed cavities, and some of which are planar, fitted together in sealed relation to provide a plurality of separate, serpentine passages, through some of which travels the liquid to be cooled, and through other portions of which pass the refrigerating agency, in this instance the refrigerant gas, the formation and arrangement of the plates being such that the lineal extent of each separate passage portion is greatly elongated for the number of plate elements used.

Figure 9:
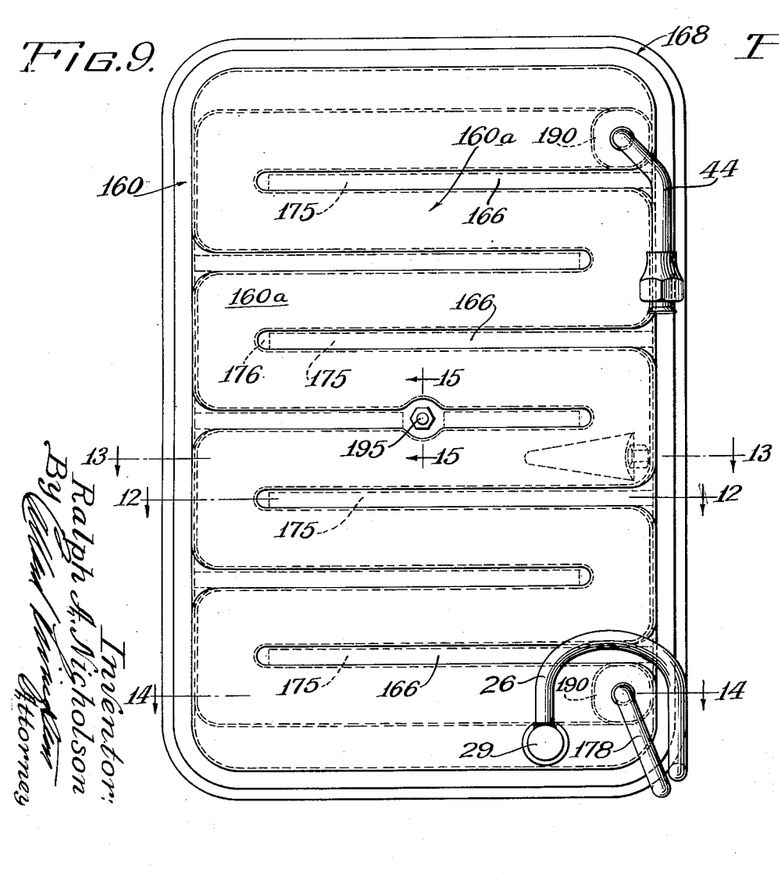
Fig. 9 is a side elevation of the heat exchanger.
Figure 10:
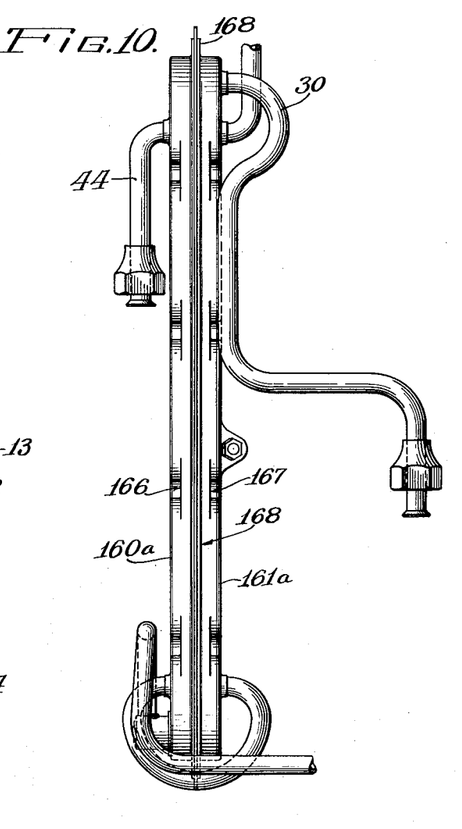
Fig. 10 is a vertical end view of the heat exchanger.

Referring to Fig. 11, the exchanger assembly consists of a pair of outer plates 160, 161 each stamped with a serpentine concavity running back and forth across the width of the plates from top to bottom so as to provide, as in the case of the plate 160 shown in Fig. 9, a serpentine or zigzag channel 160a; and in the case of the plate 161 of Fig. 11, channel 161a. These plates may be termed outer channel plates, and each of the same has a correspondingly stamped and channeled companion or inner channel plate 162, with channel portions 162a, and plate 163 with channel portions 163a.

Each pair of outer and inner channel plates, for instance plates 160, 162, has its channel portions sealed off from each other by an internal planar or flat, unembossed, plate 164, or in the case of the other set of plates, by a flat plate 165, the sealing off being effected by a continuous weld or other fluxing together of the contacting plate portions along the unstamped portions of each said set of plates, as for example at 166 or 167 (see also Fig. 9).

In addition to the welding of the sets of plates along lines 166, 167, the edgewise extremities of said plates are turned over and brought together in welded relation along edge portions 168 (see also Figs. 9, 10, and 12), the welding being accomplished by a progressive attaching of inner plate edge portions first with successive outer edge portions being welded thereto until the assembly is built up and sealed.

The foregoing arrangement of plates leaves an inner middle channel 170, which communicates through a hole 171 at the top of the left-hand set of channel plates, into the outermost left-hand channel 160a, and also through a hole 172 near the bottom of the right-hand set of channel plates with the outermost right-hand channel 161a. For purposes of distinguishing the channels readily, the left-hand outer channel 160a may be termed a first outer channel, and its corresponding inner channel portion 162a may be termed a first inner channel, the right-hand outer channel portion 161a being termed a second outer channel, and its corresponding inner channel portion 163a being termed a second inner channel, while the middle channel may be so-termed.

As seen in Fig. 9, the water inlet line 26, mentioned heretofore in connection with Fig. 1, enters the first outer channel at 29, and the course of the water is then back and forth and upwardly across the width of the unit through the hole 171 and downwardly back and forth through the middle channel, thence through hole 172 upwardly, back and forth, through the second outer channel 161a and out through tube or line 30, as indicated by the tailed arrows.

Baffle means for increasing the heat-exchange surface and also forcing the water to follow a back and forth path across the plate through the middle channel, includes a plurality of lengths of pipe 175 (Figs. 9 and 12) laid in the cavity portions 176 formed by the unstamped flat portions of the inner channel plates, such baffle elements measurably increasing the efficiency of the exchanger.

The path of the refrigerant medium or gas is indicated by plain arrows to be from the inlet line 43 near the upper right-hand corner of the plate downwardly through the second inner channel portion, thence through a cross-over pipe 178 and upwardly through the first inner channel portions 162a and out through suction line 44 to the expansion valve (Fig. 1).

As in Fig. 13, the right-hand outer channel plate 161 is provided with an outward bulge 180, fitted with a screw plug 181, sealingly receiving the termal expansion bulb 61 for the main regulator 60, which controls the operation of the compressor unit in the manner heretofore described.

It is to be noted that the upper and lower extremities 190 of the flat channel-separating plates 164, 165, are turned over and welded against outer channel plate portions in the regions adjoining the junctures of pipes or tubes 43, 44, and 178 to afford passage of the gas through the inner channels, a side view of this arrangement being indicated at 190 in Fig. 9 and also in Fig. 14. Central reinforcing means in the form of a tie-bolt 195 and spacing collar 196 is shown in Fig. 15 and affords additional means for drawing together the two sets of outer channel units and their corresponding inner channel portions.

Summary of operation

Referring to the schematic illustration of Fig. 1, and assuming that connection 63 is coupled to the usual electric power source, that tank 20 is adequately filled with flavoring syrup, and that line 25 is connected with the usual drum of carbonated water at about 30 lbs. gas pressure, the thermal control element 61, responding to the temperature of the water in the second outer channel portion 161a (Fig. 13 also) of the heat exchanger, will cause adjustable regulator 60 to close the described power circuit for the compressor unit 51, and the latter will effect compression of the refrigerant gas, which will become liquified in the condenser system 53, and the liquid refrigerant be delivered via line 56 into the receiver 40, with the compressor unit meanwhile also setting up a suction in lines 50, 49, 41, coil 42, line 43, and hence in the gas channel portions of the heat exchanger 28, with the result that liquid refrigerant is withdrawn from the receiver 40 via lines 48, 46, expansion valve 45, line 44, into the gas channels as aforesaid where expansion of the refrigerant takes place with some continued expansion via line 43 into the syrup cooling coils 42, whereby the carbonated water circulating in the water channels of the heat exchanger 28 is rapidly cooled by thermal conduction in the extended linear travel of the water through the multi-cellular and tortuous path provided therefor in said exchanger, there being in addition a pre-cooling of the syrup by coils 42.

While the compressor unit is thus operating, pump motor 72 is also energized to drive circulating pump 73, which effects a continuous circulation of the carbonated water contained in the heat exchanger 28, thereby additionally extending the lineal travel of such water along the thermal conduction path. When the desired water temperature is reached, thermal control bulb 61 will again actuate the regulator control 60 to shut off the compressor and circulating pump motors until there is again a rise in the water temperature sufficient to cause operation of control 60 to start another refrigerating cycle of the compressor.

If now a drink is to be withdrawn from the dispenser, a cup 82 is placed in the drain and support 83 and pushed against the operating button 84, closing switch 80 and starting the mixing valve motor 87 by circuit connections heretofore described, in consequence of which cam means 130, 132 effects a reciprocation of the piston 111 (Fig. 6 also), causing syrup to be withdrawn via line 32 from tank 20 in predetermined volume, determined primarily by the displacement of said piston, into the valve means 31, the return or compressing stroke of said piston forcing the measured volume of syrup against the water-valve control and blending piston or plunger 142 (Fig. 6) until the latter is sufficiently displaced to open passage 144, permitting the syrup to escape into mixing chamber 145, while at the same time said displacement of the plunger 142 causes the water valve 150 to open, admitting water from line 30 into the mixing chamber 145 for admixture with the syrup therein, and the combined liquids, i. e. syrup and water, passing into spigot parts 81a, 81 and into the cup 82.

The flow of beverage may be stopped at any point by withdrawal of the cup 82 from operating contact with the button 84, it being the usual operation of the machine to deliver a certain volume of beverage, for example 12 oz., as a result of one complete reciprocation of the mixing valve piston 111, it being understood, as heretofore explained in detail, that a lesser or greater volume of beverage may be withdrawn at will by withdrawing the cup before it is full, or by holding a cup of larger volume in place until it is filled to desired capacity.

Should the volume of syrup in tank 20 fall below a predetermined safety level, float 24 would be permitted thereby to descend and open the supervisory switch 22, which is in normally closed-circuit series with the power circuit for dispensing or mixing valve motor 87, and no drink would be delivered when the syrup level falls to said condition.

Check valve 77, which is of substantially identical construction to the valve means 137—139 of Fig. 6, is shown in enlarged detail in Fig. 8, and serves to prevent passage of the carbonated water directly from supply line 25 into the mixing valve, the water thereby being caused to pass always through the heat exchanger while the circulating means 73 is in operation, and to be withdrawn from the heat exchanger, only, upon operation of the dispensing or mixing and blending valve means 31.

While the heat exchanger 28 is applicable to other uses than in the cooling and dispensing system disclosed, it is considered an essential element of the system as applied to a compact, small counter unit by reason of the fact that its efficiency and physical characteristics make possible the inclusion of the refrigerating plant as an integral, self-contained, part of said unit, whereby various operating connections which would otherwise be required where a remotely located refrigerating apparatus were employed, are eliminated, along with attendant costs, installation, and servicing problems; and so far as is presently known, nothing afforded by the prior art in the way of a compact heat exchanging means, exists as a substitute for the novel heat exchanger disclosed herein.

In this connection, it is also pointed out that invention is claimed for the combination of the disclosed stand-by circulating means in conjunction with heat-exchanging means and dispensing valve means cooperating as in this system.

Likewise, the mixing and blending valve means generally indicated at 31 may be employed in other arrangements and applications, notwithstanding that it is peculiarly and uniquely applicable to the disclosed system in that it permits the by-passing of the water by circulation in the cooling branch thereof while at the same time affording instantaneous supply of the cooled water directly from the heat exchanger and under conditions which permit uniform and accurate mixing and blending of the syrup and water simultaneously upon withdrawal into the dispensing line without elaborate, complicated, costly equipment.

The invention of the present disclosure is not intended to be limited to precise details of construction, operation, or cooperative arrangement described and shown, excepting as may be expressly provided by the appended claims.

I claim as my invention:

1. Dispensing apparatus comprising a liquid supply, a mixing valve operable to withdraw liquid from said supply and forcibly eject the same under pressure above atmospheric, means connecting said valve with a second liquid supply under pressure, means in said valve operable by ejecting displacement of said first liquid therein for admitting and mixing said second liquid with the first liquid, and means providing egress at atmospheric pressure for the mixed liquids from said valve.

2. Dispensing apparatus comprising a first liquid source, connection for a second liquid source under pressure, a pump operable to withdraw and eject a measured amount of liquid from said first source into a dispensing outlet, means communicating said second liquid under pressure into said dispensing outlet, normally closed, fluid-opened, valve means blocking passage of said second liquid into said dispensing outlet and opened by ejecting displacement of said first liquid toward said dispensing outlet such that said liquids are intermixed in passage into said outlet, and means for actuating said pump at will.

3. Beverage dispensing apparatus comprising a syrup tank, a pump including a mixing chamber for withdrawing syrup from said tank and ejecting the syrup into said mixing chamber, a dispensing outlet leading from said chamber, means for directing carbonated water from a source of pressure supply into said mixing chamber, normally closed, fluid-opened, valve means preventing passage of said water into said mixing chamber and opened by fluid pressure of said syrup ejected into said chamber, said syrup and carbonated water intermixing in said chamber in passage into said outlet, means for actuating said pump at will.

4. Liquid dispensing apparatus comprising connection with two sources of liquid, a dispensing outlet, a mixing chamber having communication with said outlet and with both sources of liquid, coacting valve means normally closing off passage of liquid from both said sources into said mixing chamber and operable by pressure displacement of one of said liquids to open passage for both liquids into said mixing chamber, and electromagnetically driven pump means operable at will for effecting pressure displacement of one of said liquids to actuate said coacting valve means and open passage as aforesaid for both liquids, the other said liquid being displaced by gas pressure.

5. Beverage dispensing apparatus comprising connection with two sources of beverage liquid a particular one of which is under gas pressure, a mixing chamber, a dispensing outlet from said chamber, means directing said particular beverage liquid from said source into said mixing chamber, a first valve means normally preventing passage of said first beverage liquid into said mixing chamber, pressure pump means for forcing the second beverage liquid into said mixing chamber, a second valve means normally blocking passage of the second liquid into the mixing chamber and yieldable to predetermined pressure of said second liquid to open passage thereto, and means operatively interconnecting said first and second valve means such that the first valve means is opened by opening operation of the second valve means to admit the said particular liquid to the mixing chamber simultaneously with admission of the second liquid thereto.

6. Apparatus for dispensing a mixed beverage of at least two liquid constituents, one of which is under pressure, said apparatus comprising a pump having intake and discharge phases and connected with a supply of one of said liquids which is not under pressure, a discharge outlet from said pump, connection from a source of supply of another of said liquids under pressure into said discharge outlet, valve means yieldingly closing off passage of said other liquid into said discharge outlet, and valve-operating means actuated by liquid discharged by the pump means for opening said valve means to admit passage of said other liquid into said discharge outlet concurrently with passage of first liquid discharged by the pump into said outlet.

7. Beverage dispensing apparatus including a mixer having connection with a plurality of dispensable liquids to be mixed and discharged as a mixed beverage, means providing separate displacing pressures above atmospheric behind said liquids, interacting valve means normally preventing mixing confluence of said liquids but operable to permit said mixing responsive to application of a predetermined displacing pressure behind one of said liquids, and attendant-controlled means including a pump for causing application of said predetermined pressure directly compressing one of the liquids as aforesaid.

8. Beverage dispensing apparatus including a mixing valve having a mixing chamber with a discharge outlet and at least two liquid inlets for liquids, one of which is normally under pressure, and which are to be mixed and dispensed, normally closed valve means preventing entrance of said liquids into said mixing chamber, said valve means opening to admit said liquids to the chamber when the pressure behind one of them is raised from a normal at-rest value to a predetermined elevated value, and pump means for causing application of said predetermined value of pressure to one of the liquids for the purpose aforesaid.

9. Beverage dispensing apparatus including a mixing valve having a plurality of inlets for connection with liquids to be mixed and dispensed, said valve having a discharge outlet and a mixing chamber communicating with said inlets and said outlet, together with means normally closing off passage of liquid from any of said inlets into the mixing chamber, said means being displaceable by liquid pressure thereon in excess of a certain value to open passage for liquid from all inlets into the mixing chamber, at least one of said inlets being connected with a supply source of liquid under approximately constant pressure, and means operable at will for applying pressure in excess of said certain value to the liquid received in another of said inlets for actuating the displaceable means as and for the purpose aforesaid.

10. In a beverage dispenser, a mixing chamber having normally closed valved connection to liquid inlets, said valved connection being openable by fluid pressure in excess of a predetermined value behind a certain one of the liquids received at a said inlet, pump means operable to provide excess pressure as aforesaid opening said valved connection and admitting said certain one of the liquids to the mixing chamber, a second liquid received at another said inlet being forced intermixingly into said chamber with the first-mentioned certain liquid by action of gas pressure therebhind when said valved connection is open as aforesaid, and a discharge outlet for leading off the intermixed liquids from said chamber.

11. In a beverage dispenser, a mixing valve including a mixing chamber having opposite inlets and an outlet between said inlets, jointly reciprocable, spring-closed valves normally closing said inlets, connection from one inlet to a source of carbonated water, a liquid pump connected for operation to force a beverage liquid against one of said valve to open the same and the jointly movable valve for simultaneous admission of carbonated water and said beverage liquid into said chamber for admixture therein and passage therefrom through said outlet.

12. A mixing valve comprising a mixing chamber having opposite inlets, valve means closable in the same direction for closing said inlets, means yieldingly closing said valve means, a pump operable to discharge a measured amount of a first beverage liquid into a first said inlet and against a first said valve means to open the latter and admit said liquid to the mixing chamber, a second liquid being received under pressure at another said inlet and forcibly intermixed with the first liquid in said chamber responsive to opening of the valve means corresponding to said other inlet, means operatively interconnecting said valve means for joint opening movement, at least, such that opening of the first valve means by liquid discharged thereagainst, as aforesaid, will cause opening of the interconnected valve means, and means providing egress of the mixed liquids from said chamber.

13. A mixing valve comprising a mixing chamber having a plurality of inlets and at least one outlet, spring-closed valve means normally closing said inlets and yieldable to liquid pressure of predetermined value from a certain inlet to open, means delivering liquid under pressure to said inlets and at pressure values, respectively, to cause opening of the valve means when desired and confluence of the liquids into, and passage of the same from, said mixing chamber via said outlet.

14. In dispensing apparatus, a mixing valve connected with at least two liquids to be dispensed in mixed state, at least one of said liquids being under a normal predetermined head of pressure, a dispensing outlet from said valve, normally closed valves interposed between said outlet and said connection with two liquids, operative interconnection between said valves such that opening of a certain one of the same effects opening of the other, means yieldingly urging said valves into said normally closed condition, and pump means for applying a pressure to one of said liquids and force opening of said certain valve, whereby both valves will be opened at the same time to admit said liquids substantially simultaneously to pass into said outlet.

RALPH A. NICHOLSON.

REFERENCES CITED

The following references are of record in the file of this patent:

UNITED STATES PATENTS

| Number | Name | Date |
| --- | --- | --- |
| 2,285,998 | Morrison | June 6, 1942 |
| 2,328,110 | Thompson et al. | Aug. 31, 1443 |
| 2,343,315 | Morrison | Mar. 7, 1944 |
| 2,371,432 | Di Pietro | Mar. 13, 1945 |
| 2,415,861 | Bauerlein et al. | Feb. 18, 1947 |
| 2,427,429 | Waite et al. | Sept. 16, 1947 |
| 2,462,019 | Bowman | Feb. 15, 1949 |